Figures 1, 2:
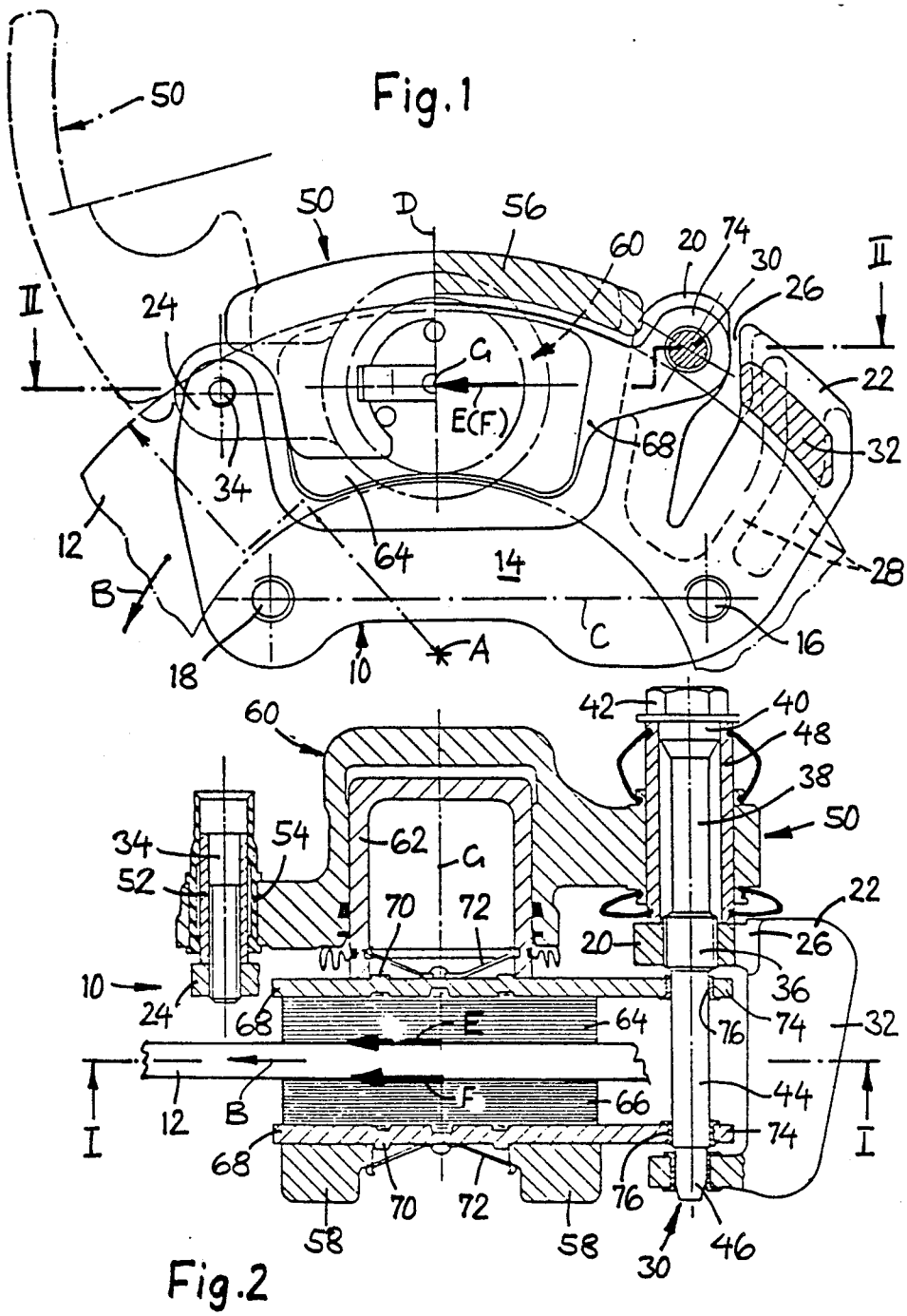

United States Patent [19]

Op Den Camp

[11] Patent Number: 4,958,703
[45] Date of Patent: Sep. 25, 1990

[54] SPOT-TYPE DISC BRAKE

[75] Inventor: Eckard Op Den Camp, Koblenz, Fed. Rep. of Germany

[73] Assignee: Lucas Industries public limited company, Birmingham, England

[21] Appl. No.: 377,445

[22] Filed: Jul. 10, 1989

[30] Foreign Application Priority Data

Jul. 15, 1988 [DE] Fed. Rep. of Germany ... 8809123[U]

[51] Int. Cl.$^5$ ............................................. F16D 55/224
[52] U.S. Cl. ............................... 188/73.31; 188/73.45; 188/205 R
[58] Field of Search ............... 188/73.31, 73.34, 73.44, 188/73.45, 73.39, 73.43, 205 R, 205 A, 206 R, 206 A

[56] References Cited

U.S. PATENT DOCUMENTS

| | | | |
|---|---|---|---|
| 3,949,839 | 4/1976 | Girauldon | 188/73.31 |
| 4,219,106 | 8/1980 | Lüpertz et al. | 188/73.39 |
| 4,220,224 | 9/1980 | Karasudani | 188/73.43 X |
| 4,410,070 | 10/1983 | Hagiwara et al. | 188/73.36 |
| 4,726,451 | 2/1988 | Giorgetti | 188/73.45 X |
| 4,775,034 | 10/1988 | Pachner et al. | 188/73.45 |

FOREIGN PATENT DOCUMENTS

| | | | |
|---|---|---|---|
| 2905833 | 9/1979 | Fed. Rep. of Germany . | |
| 0013832 | 1/1987 | Japan | 188/73.31 |
| 1260582 | 9/1986 | U.S.S.R. | 188/73.31 |

Primary Examiner—Douglas C. Butler
Attorney, Agent, or Firm—Scrivener and Clarke

[57] ABSTRACT

A disc brake comprises a brake support which is to be mounted on a first side of a brake disc and comprises a bridge portion engaging over onto the other side. Two brake pads are arranged on either side of the brake disc and supported against braking forces on the brake support. For direct actuation of a brake pad an actuator is arranged on the first side of the brake disc. For transmitting actuating forces to the other indirectly actuable brake pad a floating caliper engages over the brake disc. The brake support comprises two arms on the first side of the brake disc. Of the arms, a first arm of lower rigidity is loaded with the braking forces of the directly actuated brake pad. The other arm, which has a greater rigidity carries the bridge member and is loaded with braking forces of the indirectly actuated brake pad. The two arms are adapted to each other in their rigidity in such a manner that the two brake pads on braking execute at least approximately equimagnitude movements in the direction of the braking forces due to elastic deformations of the brake.

7 Claims, 1 Drawing Sheet

SPOT-TYPE DISC BRAKE

The invention relates to a spot-type disc brake comprising a brake support which is to be mounted on a first side of a brake disc and comprises a bridge portion engaging over onto the other side, two brake pads which are arranged on either side of the brake disc and supported against the braking forces at the brake support, an actuator which is arranged for direct actuation of a brake pad on the first side of the brake disc and a floating caliper which for transmitting actuating forces to the other indirectly actuated brake pad engages beyond the brake disc.

In a known spot-type disc brake of this type (DE 2905833 A1) the bridge portion of the brake support consists of two bridge legs which extend at right-angles to the brake disc beyond the outer edge thereof and at their opposing sides have guide surfaces for the two brake pads. On actuation of the brakes the brake forces acting on the brake pads are transmitted to the guide surface of the exit-side bridge leg, that is the bridge leg past which each individual point of the brake disc edge moves before it leaves the region of the brake. To avoid the braking forces excessively loading the exit-side bridge leg the free ends of the two bridge legs are connected together by a cross yoke. In this manner the elastic bending of the two bridge legs is limited but not completely prevented. Each of the two bridge legs comprises a bore which is normal to the brake disc and in which a guide pin secured to the floating caliper is displaceably guided. When the two bridge legs are deformed on braking the two bores no longer extend normally to the brake disc and accordingly the floating caliper also tilts. As a result an inclined wear of the brake pads in the tangential direction of the brake disc is promoted. This inclined wear in the known brake can be kept in limits only by giving the two bridge legs such large cross-sections that their elastic bending is kept small. To accommodate these large cross-sections within a wheel dish of a vehicle wheel of given diameter a relatively small brake disc must be used and this restricts the performance and efficiency of the brake.

The invention is based on the problem of keeping the inclined or oblique wear of the brake pads in the tangential direction of the brake disc within narrow limits utilizing simple and compact means.

This problem is solved according to the invention in a spot-type disc brake of the type mentioned at the beginning in that the brake support comprises at the first side of the brake disc two arms of which a first arm of lower rigidity is loaded with the braking forces of the directly actuated brake pad, a second arm of higher rigidity carries the bridge portion and is loaded with the braking forces taken up thereby of the indirectly actuated brake pad, and said two arms are adapted to each other in their rigidity so that the two brake pads on braking execute at least substantially equimagnitude movements in the direction of the braking forces due to elastic deformations of the brake.

According to the invention the second arm is made as torsionally rigid and the bridge portion as flexurally rigid as the spatial conditions permit. The first arm is made deliberately weaker than the spatial conditions would permit and is separated from the second arm in such a manner that its relatively large elastic deformation on braking is not restricted by the more limited elastic deformation of the second arm. Due to these elastic deformations the two brake pads move through equal or at least approximately equal distances in the direction of a tangent or secant of the brake disc. The floating caliper forms together with the actuator a tongs-like unit which on braking always tends to maintain its original position with respect to the two brake pads. Now, since the two brake pads move equal amounts in the direction of the braking forces the tongs formed by the floating caliper and the actuator can follow this movement without tilting. The tendency of oblique wear of the brake pads thus does not occur or at least is kept within narrow limits.

It is fundamentally possible to arrange one of two said arms on the entry side and the other on the exit side of the brake. However, preferably both arms are arranged on the entry side of the brake with respect to the operating direction of rotation of the brake disc.

An example of embodiment with further advantageous details of the invention will be explained in detail hereinafter with the aid of the schematic drawings, wherein:

FIG. 1 shows a spot-type disc brake for a motor vehicle seen in the direction of the wheel axis from the inside to the outside and partially in section I—I according to FIG. 2, and FIG. 2 shows a section in the axis of parallel plane II—II of FIG. 1.

The brake illustrated comprises a brake support 10 which is intended for mounting on an axle housing or stub axle axially within a brake disc 12 with respect to the associated vehicle. For this purpose the brake support 10 comprises a base part 14 which extends mainly in the direction of a secant of the brake disc 12 and on the entry and on the exit side of the brake comprises in each case a hole 16 and 18 respectively for a mounting screw. Entry side means, as above, the side of the brake which is reached first by each point of the brake disc 12 rotating about the axis A in the direction of the arrow B. The axes of the holes 16 and 18 lie according to FIG. 1 in a common secant plane C; the entry-side hole 16 is further remote from the centre plane D containing the axis A than the exit-side 18.

Three arms 20, 22 and 24 extend approximately radially outwardly, with respect to the axis A, from the base part 14. The arms 20 and 22 both lie on the entry side of the brake and are separated from each other by a radial gap 26. The arms 20 and 24 are arranged approximately symmetrically with respect to the centre plane D; the arm 20 is made however somewhat less robust than the arm 24. The second arm 22 is further remote from the centre plane D than the first arm 20 and is dimensioned considerably stronger than each of the arms 22 and 24. A common feature of the arms 22 and 24 is that each of said arms originates approximately from one of the holes 16 and 18, i.e. has its root in a region in which the base part 14 is secured to a relatively rigid vehicle part.

At its narrowest point the gap 26 is just large enough to avoid the two arms 20 and 22 mutually contacting each other on all elastic deformations occurring in operation. The first arm 20 is relatively flexible in the peripheral direction of the brake disc 12. The second arm 22 is stiffened by ribs 28 which restrict its deformability as narrowly as possible.

An axis-parallel bolt 30 is secured to the radially outer end of the first arm 20. From the radially outer end of the second arm 22 a bridge portion 32 of the brake support originates and extends parallel to the axis A beyond the brake disc 12 and is angled on the other side of the brake disc approximately radially inwardly. A second axis-parallel bolt 34 is secured to the radially outer end of the third arm 24.

The first axis-parallel bolt 30 has approximately in the centre of its overall length a threaded portion 36 which is screwed into the first arm 20. This is followed in the axially inward direction by a cylindrical shank 38 which terminates in a thickened centering portion 40. A screw 42 with hexagonal head is screwed into said portion 40. The threaded portion 36 is followed axially outwardly by a cylindrical outer shank 44 which terminates in a spigot 46 of reduced diameter.

Arranged round the shank 38 is a guide 48 in the form of a cylindrical bush which is centred on the centering portion 40 and is clamped with the screw 42 releasably to the first arm 20. A floating caliper 50 is guided displaceably parallel to the axis A on the guide 48. A second guide for the floating caliper 50 is formed by a bush 52 and a resilient sleeve 54 which surrounds said bush with radially spacing, these being secured with the bolt 34 to the third arm 24.

The floating caliper 50 comprises a bridge member 56 which engages over the radially outer edge of the brake disc 12 and terminates on the vehicle-outer side in a pair of support fingers 58 which are directed substantially radially inwardly. Arranged on the vehicle-inner side of the floating caliper 50 is a hydraulic actuator 60 having a piston 62.

Further main components of the brake are a directly actuable brake pad 64 on the vehicle-inner side and an indirectly actuable brake pad 66 on the vehicle-outer side of the brake disc 12. The two brake pads 64 and 66 each comprise a back plate 68 having a centering projection 70 which in the case of the directly actuated brake pad 64 is centred on the piston 62 whilst the centering projection 70 of the indirectly actuated brake pad 66 is held centred between the support fingers 58. Furthermore, a multiarm retaining spring 72 is fixedly riveted to the back plate 68 of each of the two brake pads 64 and 66 and is engaged in the piston 62 or on the support fingers 58.

Finally, each of the back plates 68 comprises a guide projection 74 through which an axis-parallel sliding bush 76 extends. The axially outer shank 44 of the bolt 30 extends almost free of play through said two sliding bushes 76 so that the two brake pads 64 and 66 are axially displaceable and transmit all the braking forces occurring in braking to the shank 44.

The braking forces which on braking are exerted on the brake pads 64 and 66 by the brake disc 12 rotating in the operating rotational direction B are denoted by E and F respectively. The braking force E is transmitted via the back plate 68 of the directly actuated brake pad 64 due to the relatively small spacing of the latter from the first arm 20 practically solely to said arm. On the other hand, the braking force F is transmitted via the back plate 68 of the indirectly actuated brake pad 66 due to the relatively small spacing thereof from the spigot 46 practically solely via said spigot to the bridge portion 32 and by the latter to the second arm 22.

Admittedly, the leverage of the force F with respect to the second arm 22 is considerably greater than the leverage of the force E with respect to the first arm 20. Since however the second arm 22 has considerably greater dimensions than the first arm 20 the two arms 20 and 22 bend to equal extents in the direction of the braking forces E and F. As a result the two brake pads 64 and 66 move through the same distances in said direction. The axis G of the actuator 60, which when the brake is unactuated extends parallel to the axis A through the centre points of the two brake pads 64 and 66, moves with the brake pads on braking parallel to itself and thus also remains parallel to the axis A. A wear of the brake pads 64 and 66 inclined in the direction of the braking forces E and F thus cannot arise to any appreciable extent.

I claim:
1. A spot-type brake comprising:
    a brake support (10) mounted on a first side of a brake disc (12) and having a bridge portion (32) extending over said disc to the second side thereof,
    first and second brake pads (64, 66) respectively arranged on said first and second sides of said brake disc (12) and supported against the braking forces at said brake support (10),
    an actuator (60) which is arranged for direct actuation of said first brake pad (64) onto said first side of said brake disc (12), and
    a floating caliper (50) for indirect actuation of said second brake pad (66) onto said second side of said brake disc (12), characterized in that said brake support (10) carries at said first side of said brake disc (12) first and second arms (20, 22) of which
    said first arm (20) is of lower rigidity than said second arm (22) and is arranged to sustain the braking forces of said first directly actuated brake pad (64), and
    said second arm (22) is of higher rigidity than said first arm (20) and carries said bridge portion (32) and is arranged to sustain the braking forces of said second indirectly actuated brake pad (66),
    said two arms (20, 22) being adapted to each other in their relative rigidity so that said first and second brake pads (64, 66) on braking move substantially equal distances in the direction of the braking forces (E, F) due to elastic deformations of said brake.

2. Spot-type disc brake according to claim 1, characterized in that said first and second arms (20, 22) are arranged on the entry side of said brake with respect to the operating rotational direction (B) of said brake disc (12).

3. Spot-type disc brake according to claim 1, characterized in that said first and second arms (20, 22) extend at least approximately radially to the axis (A) of the brake pad (12).

4. Spot-type disc brake according to claim 1, characterized in that said first arm (20) of lower rigidity carries a bolt (30) on which said first directly actuated brake pad (64) is guided.

5. Spot-type disc brake according to claim 4, characterized in that said bolt (30) extends beyond said brake disc (12) onto the other side thereof where it guides said second indirectly actuated brake pad (66) and is supported at a slight distance from said latter at the bridge portion (32).

6. Spot-type disc brake according to claim 4, characterized in that said bolt (30) comprises a shank (38) which is directed away from said brake disc (12) and on which a guide (48) for said floating caliper (50) is disposed.

7. Spot-type disc brake according to claim 6, characterized in that said floating caliper (50) is elastically supported at a second bolt (34).

* * * * *